May 18, 1965  R. C. BENTON  3,184,599
TABLE STOPPING DEVICE HAVING NULL SENSOR
Filed Aug. 13, 1962  2 Sheets-Sheet 1

INVENTOR.
Robert C. Benton
BY John W. Gaines
ATTORNEY

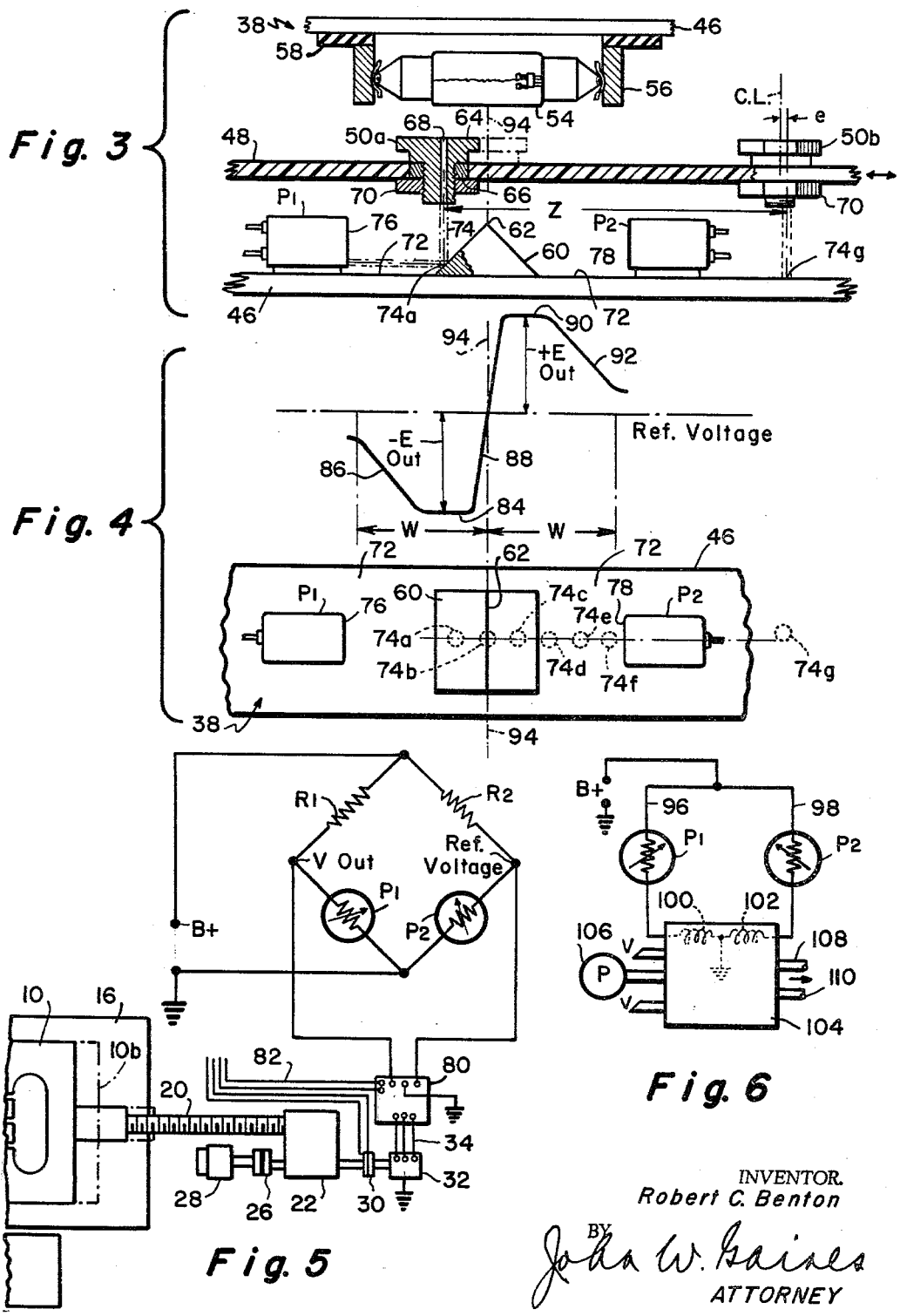

United States Patent Office 3,184,599
Patented May 18, 1965

3,184,599
TABLE STOPPING DEVICE HAVING NULL SENSOR
Robert C. Benton, State College, Pa., assignor to Centre Circuits, Inc., State College, Pa., a corporation of Pennsylvania
Filed Aug. 13, 1962, Ser. No. 216,655
13 Claims. (Cl. 250—220)

This invention relates to the relative positioning of tables or other work supports, tools, and the like for automatic machining. It relates more particularly to a photoelectrically operated stopping device having a precision null sensor for automatically controlling the terminal position of a moving part without physically contacting the part that is moving. The sensitivity achieved by my null sensor is exceptionally high so that there is no sacrifice of accuracy. Because the need for physical contact is eliminated, there is no appreciable inertia, distortion, or cumulative wear problem involved each time the moving part is stopped.

Hitherto, stops, limit switches, and other expedient devices have been employed of a class requiring physical engagement for tripping them so as to stop some moving part such as a machine tool work support, e.g., a milling machine table. One difficulty is that these stopping devices require adjustment and service attention because of wear, distortion, and the like. Also this class of device is subject to inaccuracies and similarly, prior light sensing devices for this purpose are subject to inaccuracies. Further, there is the disadvantage that rather intricate positioning systems are commonly employed in conjunction therewith in order to operate the table with a right sense of direction, regarding which way to move, so that, based on the sense of position, these stopping devices can then appropriately stop the table.

In accordance with the present improvement, my invention employs a relatively fixed beam splitter on which I provide an accurately formed knife edge. Also provided, disposed one at each side of the splitter, is a companion pair of photosensitive surfaces with a normally balanced electrical output and with an electrically-operated, table positioning device connected in their output. When a selected one of a plurality of light directing tubes or bushings on the table lines up with the beam splitter, the core of the beam from the tube shines squarely upon and is split by the edge so as to be divided precisely between the photosensitive surfaces. The light directing orifice of each bushing is very small so as to hold the beam to a minute size and thus the core of the beam falls as a mere dot upon the splitter.

The photosensitive surfaces are connected to supply output current in the right sense and to interrupt the current at the right time for stopping the table, doing so in a simple manner materially overcoming the foregoing disadvantages as will now be explained. Thus, it will be seen that the use of two photosensitive surfaces inherently affords an accurate sense of position and an equally accurate sense of direction as they reach a balance or become unbalanced one way or another in their infallible manner of always causing movement precisely toward the right stopping point; the accuracy and operation of the beam splitter insures the accuracy of the stopping point just mentioned.

Further features, objects, and advantages will either be specifically pointed out or become apparent when, for a better understanding of the invention, reference is made to the following description taken in conjunction with the accompanying drawings, which form a part hereof and in which:

FIGURE 3 is a view of the beam splitter in front elevational view taken along the lines III—III of FIGURE 2;

FIGURE 4 is a composite view, partially diagrammatic, of the splitter of FIGURE 3 shown in top plan view;

FIGURE 5 is a schematic view of the control circuit; and

FIGURE 6 is a schematic view of a modified control circuit.

Figure 1:
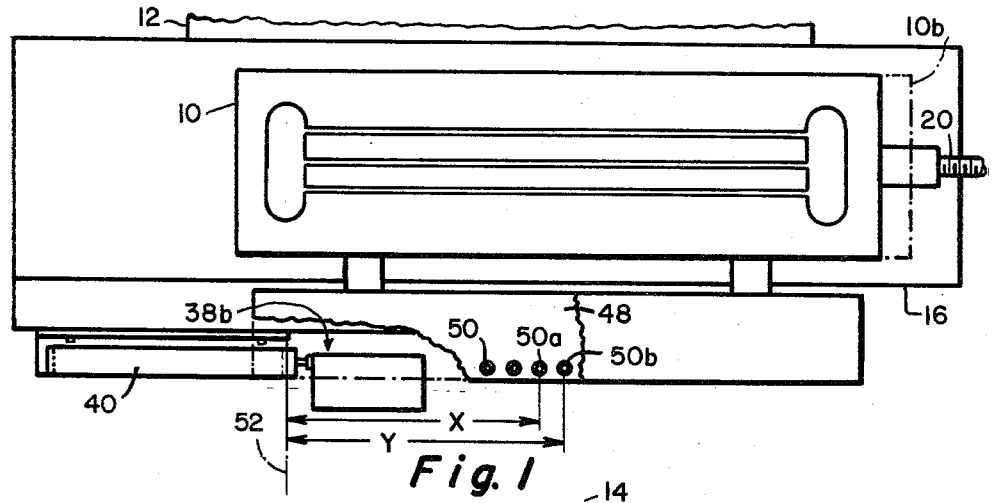
FIGURES 1 and 2 are top plan and end elevational views respectively of a machine tool embodying the present invention.
Figure 2:
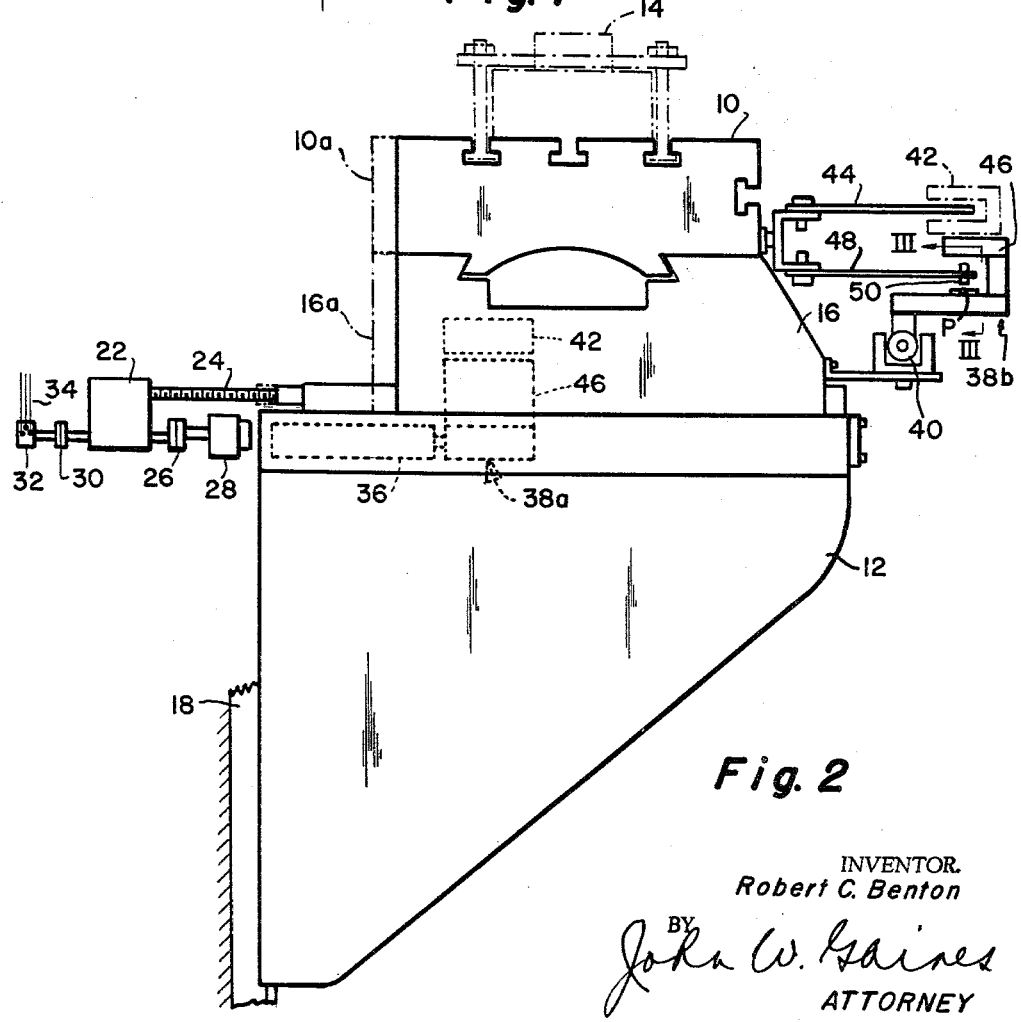

More particularly in FIGURES 1 and 2 of the drawings, a longitudinally movable table 10 is shown, forming part of a machine tool which further includes a vertically movable knee 12. A workpiece 14 is clamped to the table 10 and, in the case of a milling machine installation which can serve as an illustrative example, the workpiece 14 is engaged by a milling head, not shown, which is adjusted on the machine to operate on different fixed axes of rotation.

A transversely movable saddle 16 is supported by the knee 12 and supports the table 10. Vertical adjustment is secured by raising and lowering the knee 12 on a set of vertical ways 18 carried by the machine.

A dual input drive, not shown, mechanically rotates a lead screw 20 for moving the table 10 toward and away from the dotted line position 10b. Another duel motor input drive 22 rotates a similar lead screw 24 to move the saddle 16 and the table thereon toward and from their dotted line positions shown by the dotted lines 10a and 16a. An electrically operated clutch 26 couples an inch motor 28 to one of the inputs of the drive 22 and another electrically operated clutch 30 couples the other input shaft and a decimal increment motor 32 which is controlled by amplifier leads 34.

A difference gage 36 carried by the knee 12 supports a table positioning and stopping mechanism indicated by the reference numeral 38a, another difference gage 40 supports a table positioning and stopping mechanism 38b which is carried by the saddle 16.

The difference gage forms no per se part of the present invention. They can each be of the type generally as shown in copending Benton et al. patent application U.S. S.N. 216,653, filing date August 13, 1962, now Patent No. 3,154,858. The difference gage preferably moves to any decimal point within a whole unit of travel, e.g., one inch, one-half inch, etc.

Each of the mechanisms 38a and 38b includes a so-called large increment positioner 42 which sensitively straddles a relatively movable strip 44 and which is connected to operate an inch motor 28 in a way to move the table to the right inch point, for example, to the 12 inch mark. When it senses that point on the strip 44, the positioner 42 is connected to emit a signal for automatically switching the control to a null sensor device 46 which operates the decimal increment motor 32. In this way, the mechanism 38b fully controls the lead screw 20 and the mechanism 38a fully controls the lead screw 24.

The table 10 and the saddle 16 carry individual plastic strips 48 each of which is straddled by an appropriate null sensor 46. For the sake of brevity, only the strip 48 carried by the table 10 is described and illustrated.

The strip 48 carries a row of upstanding light guide tube elements which are generally designated 50 and particular ones of which are designated 50a and 50b for identification. They are located in consecutive multiples of a whole unit away from a zero reference line 52 on the strip 48. In the illustrated embodiment where the selected unit was one inch, the tube 50a was a distance X away from the reference line, say eight inches. The tube 50b was one unit farther away so that the distance Y (FIGURE 1) was nine inches. Beginning at the instant the null sensor 46 is activated, it operates to bring the moving part to a stop so that the null sensor 46 is precisely in registry with the nearest tube 50.

In FIGURES 3 and 4, the null sensor of the positioning and stopping mechanism generally designated 38 has upper and lower portions both designated 46 which straddle the strip 48. A light source carried by the upper portion consists of a longitudinal filament bulb 54 sometimes known as a fuse type bulb. It is supplied through contacts at its opposite ends with electric current flowing through a holder 56 supported on insulation bases 58. The bulb 54 is fixed in the vertical plane of two photo-sensitive devices P1 and P2, each facing toward a common prismatic reflector 60. The reflector 60, which is transversely disposed with respect to the photosensitive devices, defines an upstanding 90 degree knife edge 62 which is in line with the mid portion of the bulb 54.

Each of the tubes consists of a bushing 64 rotatably received in inserts 66 carried by the strip 48. The strip 48 is opaque or fairly opaque and the inserts 66 are so located that their sockets are approximately one inch apart. A thick edged orifice 68 in each bushing is formed eccentrically to the center line C.L. of that bushing. Thus the bushing can be rotated to make the orifice an exact whole multiple away from the zero reference point 52, not shown, on the strip 48; therefore it follows that as between the eight inch tube 50a and the nine inch tube 50b, the center-to-center distance Z equals 1.000 inch. The rotative position when preset can be held by friction and if desired a lock nut 70 can be provided on the bushing to insure against unwanted change of the center distances.

The horizontal surfaces 72 between the reflector 60 and each of the devices P1 and P2 are metal and are preferably sandblasted so as to be highly reflective. Each orifice 68, of which the length to diameter ratio is at least five to one in practice, limits the beam from the bulb 54 to a core 74 of the light. This light falls as a dot upon the reflector 60 or upon the surfaces 72; various spot positions of these cores of light are indicated at points 74a to 74g inclusive in FIGURE 4.

In one physically constructed embodiment of the invention, the devices P1 and P2 were photoresistor cells, Clairex photocell type CL 504. With increasing light falling upon their respective photosensitive surfaces 76 and 78, the electrical resistance of these cells decreases as, for example, when the core of the light beam reflects from the dot 74a in direct reflection upon the surface 76.

In accordance with the control schematic of FIGURE 5, an electrical bridge circuit is provided which includes the cells P1 and P2. A balanced amplifier 80 is connected in the output of the bridge and receives a reference voltage from a bridge output terminal to which the photocell P2 and a resistor R2 are connected in common. A voltage V out is fed to the amplifier from the opposite bridge output terminal to which the photocell P1 and a resistor R1 are connected in common.

A sequencer console, not shown, operates the inch motor 28 sufficiently to bring the table to the right inch point at which time the console through a series of leads 82 sets in operation the amplifier 80, the decimal increment motor 32 which is supplied by the amplifier leads 34, and an electric clutch 30. The decimal increment motor 32 in the amplifier output is preferably a stepping motor and it rapidly completes the last few decimal steps of movement of the table into the right terminal point where it stops the table.

The output voltage V out is best understood with reference to FIGURES 4 and 5. So long as the core of the beam falls as a dot 74a somewhere on the associated side surface of the reflector 60, the voltage V out has a constant value —E out as seen in FIGURE 4 and designated by the flat portion 84 of the voltage curve. A rounded knee at one end of the portion 84 connects it with a portion 86 of the curve which illustrates the condition of the dot falling on the reflective surface 72.

A sharp knee connects the portion 84 with a nearly vertical, linear portion 88 of the curve along which the voltage is seen to pass through the null point or zero value up to a positive value. On this positive side, a sharp knee in the curve connects the nearly linear portion 88 and a constant output voltage portion 90 which is flat. A rounded knee joins the flat portion 90 of the curve and a portion 92 of gradually decreasing voltage indicative of the dot moving through the position 74d, 74e, and 74f.

Due to the eccentricity of adjustment e previously discussed, it can be noted from the FIGURE 4 that the dot locus of the core of light from one tube is not necessarily aligned with the center line of the cells P1 and P2 and is not necessarily aligned with the dot locus of the other tubes, for instance, the dot 74g coming from the tube 50b. Thus these loci can have considerable lateral offset so long as they are above the knife edge 62 when crossing the plane 94 of the knife edge 62. The surfaces 76 and 78 are spaced apart a distance such that the dot of light can travel an effective distance W to either side of the plane 94 and such that the surface 76 or 78 will be activated by sufficient reflected light to set the decimal motor 32 in motion and in the proper direction.

Use of the knife edge 62 as a beam splitter in the present arrangement has resulted in exceptionally high sensitivity of output. In terms of table movement, the sensitivity at the point where the linear portion 88 of the curve of FIGURE 4 crosses the reference voltage axis was sufficient to develop 0.2 volt per 0.0001 inch of movement. Also, it will be appreciated that the use of a single light source, coupled with the beam splitting action of the 90° knife edge 62, yields high stability.

Following is an example of the dimensions and specifications of one physically constructed embodiment of the invention:

| | |
|---|---|
| Resistors R1 and R2 | 10 K. |
| —E out | —60 volts. |
| E out | 60 volts. |
| Reflector 60 | 0.500 inch. |
| Distance W | polished metal prism. |

It is not essential that the table of FIGURES 1 and 2 be mechanically moved nor is it essential that the null sensor rely on a voltage difference developed by the cells.

In FIGURE 6, a modified form of the invention is shown wherein power to move the table is hydraulically applied and wherein the null sensor operates in response to the circuit difference developed by the photosensitive devices P1 and P2.

The legs 96 and 98 of parallel circuits are arranged with each including one of the photosensitive devices P1 and P2 and each including one of the coils 100 and 102 of a highly sensitive, electromagnetic proportioning valve. The coils 100 and 102 are wound and connected in opposition to one another so as to produce zero resultant magnetic force when the legs 96 and 98 supply equal current therethrough. These coils are included in a servovalve of which the Raymond Atchley Model 410 servovalve 104 is found to be a satisfactory make. The servovalve 104 prevents hydraulic flow when the coils are in magnetic balance.

A hydraulic pump 106 supplies fluid which is directed by the valve 104 selectively through hydraulic lines 108 and 110 leading to a table positioning cylinder, not shown. In the course of operation, in case the illumination is higher in cell P2 and lower in cell P1, for example, the current in coil 102 will be higher and the current in coil 100 will be lower. In that case, a magnetic unbalance will result in the coils, causing hydraulic flow to the table positioning cylinder in a direction causing the table to move to the point where the light on the cell device P1 and the light on the cell device P2 are equal. The lines 108 and 110 are blocked by the valve 104, hydraulically locking the table. This condition occurs at the so-called null point where the table has reached its final position.

It is understood from the foregoing that the control of the photoresistor cells over the decimal motor 32 is continuous from anywhere within a full inch of travel, once the coupling clutch of the inch motor 28 has been disengaged. In other words, the present device becomes an accurate automatic table positioning and stopping mechanism whenever the selected tube 50 is within one-half inch either way of the plane 94 of the light splitter edge 62. Due to the fact that only a dot-sized core of the beam is admitted to the reflector 60, it is evident that when the dot reaches the position 74b of FIGURE 4, this position can be ascertained with a high degree of accuracy.

Variations within the spirit and scope of the invention described are equally comprehened by the foregoing description.

What is claimed is:

1. The combination of a relatively fixed null sensor comprising longitudinally spaced apart photosensitive devices, a transversely disposed reflective object therebetween of prism shape and presenting a beam splitting knife edge, an illuminating bulb in vertically spaced apart confronting relation to the knife edge of the prism and disposed in the vertical plane of the photosensitive devices, and an intervening, longitudinally movable opaque strip between the bulb and prism, said strip carrying upstanding beam-guiding tube means establishing cooperation with the reflective object when precisely in the vertical plane of the knife edge, whereby the core of the light beam shines squarely on the edge so as to precisely split the beam from said bulb equally between the photosensitive devices, said upstanding beam guiding tube means comprising a plurality of equally spaced apart tubes carried by the opaque strip and having means of adjustment with respect to the strip so that the strip undergoes precisely uniform amounts of travel between the point where one tube shines light squarely on the edge and the points where each successive tube shines the light squarely on said edge.

2. The combination of a relatively fixed null sensor comprising longitudinally spaced apart photosensitive surfaces, a transversely disposed reflective prism therebetween presenting a beam splitting knife edge, an illuminating bulb in vertically spaced apart confronting relation to the knife edge of the prism and disposed in the vertical plane of the photosensitive surfaces, and an intervening longitudinally movable opaque strip between the bulb and the prism, said strip having means securing thereto equally spaced apart, individual beam-guiding tubes establishing cooperation with the prism when each is precisely in a vertical plane of the knife edge, whereby the core of its light beam shines squarely on the edge so as to precisely split the beam from said bulb equally between the photosensitive surfaces, said means of securement comprising sockets spaced approximately uniformly apart along said strip, a light orifice member rotatively seated in each socket, the orifice of each member being eccentric to the axis of the socket and of the orifice member, and means for preventing unwanted movement of said member from a pre-set rotative position in said socket.

3. The combination of a relatively fixed null sensor comprising longitudinally spaced apart photosensitive devices, a transversely disposed reflective object therebetween of prismatic shape and presenting a beam splitting knife edge, an illuminating bulb in vertically spaced apart, confronting relation to the knife edge of the prismatic object and disposed in the vertical plane of the photosensitive devices, and an intervening longitudinally movable opaque strip between the bulb and prismatic object, said strip having means securing thereto individual beam guiding tubes establishing cooperation with the prismatic object when precisely in the vertical plane of the knife edge, whereby the core of the light beam shines squarely on the edge so as to precisely split the beam from said bulb equally between the photosensitive surfaces, each tube defining a thick edged orifice with a length to diameter ratio of at least approximately 5 to 1.

4. For use with a support, and a table member thereon adapted for movement with respect to the support: apparatus on said support including stop-controlled drive means for driving the table member; photo-sensitive stop means having plural photosensors and actuated by a part connected to the member to discontinue the drive and halt the member when it reaches a predetermined position along the direction of movement; said part comprising a series of equally spaced apart elements carried by the member, a selected one of which is sensed by the plural photosensors of the stop means which acts to discontinue the drive; the stop means itself being adjustable over a limited distance along the direction of movement.

5. For use with a relatively movable table and a fixed support supporting the table, the combination with drive means to relatively move said table: a support-connected null sensor comprising longitudinally spaced apart photosensitive surfaces; a transversely disposed, prismatic reflector therebetween and presenting a beam splitting knife edge; an illuminating bulb in vertically spaced apart confronting relation to the knife edge of the prismatic reflector and disposed in the vertical plane of the photosensitive surfaces; and a table-connected opaque strip intervening in the space between the bulb and the reflector and movable with the table; said strip carrying a plurality of equally spaced apart upstanding beam guiding bushings establishing cooperation with the reflector when precisely in the vertical plane of the knife edge, whereby the core of the light beam shines squarely on the edge so as to precisely split the beam from said bulb equally between the photosensitive surfaces; and balanced amplifier means in the output of the photosensitive surfaces and connected to de-activate the drive means in response to a null condition sensed thereby, indicative of an equal balance of light between the photosensitive surfaces.

6. For use with a relatively movable table and a relatively fixed support supporting the table, the combination of claim 5 wherein each beam guiding bushing defines a thick edged orifice with a length to diameter ratio of at least approximately 5 to 1.

7. For use with a relatively movable table and a relatively fixed support supporting the table, the combination with drive means to relatively move said table: of a support-connected null sensor comprising longitudinally spaced apart photosensitive surfaces, a transversely disposed prismatic reflector therebetween and presenting a beam splitting knife edge, a light source in vertically spaced apart confronting relation to the knife edge of the prismatic reflector and disposed in the vertical plane of the photosensitive surfaces; a table-connected opaque strip intervening in the space between the light source and prismatic reflector and movable with the table; said strip having means securing thereto a plurality of equally spaced apart individual beam guiding bushings establishing cooperation with the reflector when precisely in the vertical plane of the knife edge, whereby the core of the light beam shines squarely on the edge so as to precisely split the beam from said light source equally between the photosensitive surfaces; a bridge, the legs of which include said photosensitive surfaces; and balanced amplifier means in the output of said bridge connected for operating the drive means; said bridge providing voltage in the output of one sign unbalancing the amplifier causing it to drive the table one way when one photosensitive surface is receiving a majority of light, and voltage of the opposite sign when the other photosensitive surface is receiving a majority of the light, and a zero voltage balancing the amplifier to stop the drive when the core of the light beam is divided equally between the photosensitive surfaces.

8. In a null sensor, the combination of a movable opaque strip having an illuminated side and a dark side, a relatively fixed member having a reflective surface confronting said strip and disposed on the dark side of the strip, a prismatic reflector secured to said surface in transverse disposition to the path of travel of said strip, photosensitive devices disposed one at each side of said reflector and being at a mutual distance from said reflector, a major portion of which distance is constituted by said reflective surface, a plurality of equally spaced apart orifice bushings carried by said strip for transmitting light from the illuminated side to the member on the dark side of said strip, and means connected in the output of said devices and from which an electrical output is developed continuously as the light moves in the space along said surface and along said reflector between the photosensitive devices.

9. In a null sensor, the combination of claim 8, characterized whereby said surface is constituted by a sand-blasted metallic surface, said electrical output consisting of voltage and derived from the legs of an electrical bridge each including a different one of said photosensitive devices therein.

10. In work positioning mechanisms for moving a machine tool part such as a table along an axis to a precise position for performing a work operation: the combination with a moving, table-connected strip presenting light transmitting and light blocking portions; of a bulb having an appreciably long linear filament disposed so as to extend parallel to said axis and shining its light on one side only of the moving strip; and means on the other side of the moving strip for driving and stopping the table upon sensing a portion of said strip, comprising a null sensor device having a mounting surface; and a beam splitting object occupying said mounting surface and having two spaced apart photosensor means disposed one on each side thereof and being spaced apart in the direction parallel to said axis; the object on said surface being transversely disposed in its position of occupancy thereupon, which surface for its major portion between the photosensor means being unoccupied and highly light reflective.

11. The invention of claim 10, wherein said strip carries a straight empty tube perpendicularly disposed on a light blocking portion and disposed perpendicularly to said axis and, when following along the linear filament, arranged to register therewith to direct a dot of the bulb light in a locus of points along said surface and to a null point squarely in the midplane of said beam splitting object, all points being sensed by at least one of said photosensor means.

12. In mechanism for moving and stopping one of a pair of first and second machine tool parts in a precise final position relative to one another, and including a light source and a null sensor arranged in spaced apart confronting relation and connected to the second one of the relatively movable parts: the improvement comprising an opaque strip interposed in said space adapted tube connected for movement with the relatively movable first part; said strip having means securing thereto a plurality of equally spaced apart beam-guiding tubes each establishing cooperation to collimate a light beam when each is in confronting relation to the light source in the plane thereof, whereby the core of the light beam will shine upon the null sensor; said means of securement comprising sockets spaced approximately uniformly apart along said strip; a light orifice member rotatively seated in each socket; the orifice of each member being eccentric to the axis of the socket and of the orifice member; and means by which each member is adjustably moved into a pre-set rotational position in the associated socket.

13. The invention of claim 12, wherein said light orifice members consist of straight empty tubes each defining a thick edged orifice with a length to diameter ratio of at least approximately five to one.

References Cited by the Examiner
UNITED STATES PATENTS

| | | | |
|---|---|---|---|
| 2,692,527 | 10/54 | Wetzel et al | 88—14 |
| 2,703,505 | 3/55 | Senn | 88—14 |
| 2,737,158 | 3/56 | Seybold et al. | 250—219 X |
| 2,989,639 | 6/61 | Dulebohn et al. | 250—202 |

RALPH G. NILSON, *Primary Examiner.*
WALTER STOLWEIN, *Examiner.*